United States Patent [19]

Belokin, Jr.

[11] Patent Number: 4,461,387

[45] Date of Patent: Jul. 24, 1984

[54] INTEGRAL SPRING CLIP SUPPORT ASSEMBLY FOR DISPLAYING ARTICLES

[76] Inventor: Paul Belokin, Jr., Rte. 4, Hayward, Wis. 54843

[21] Appl. No.: 407,118

[22] Filed: Aug. 11, 1982

[51] Int. Cl.³ .............................................. A47G 29/00
[52] U.S. Cl. ........................................ 211/71; 211/89; 211/194; 248/159; 403/379; 403/361
[58] Field of Search ................ 211/71, 89, 205, 189, 211/133, 194; 248/165, 159; 403/378, 379, 387, 361, 373, 381; 24/259 R, 259 FS

[56] References Cited

U.S. PATENT DOCUMENTS

| | | | |
|---|---|---|---|
| 1,176,306 | 3/1916 | Levis | 211/189 X |
| 2,532,020 | 11/1950 | Gunderson | 24/259 R X |
| 2,532,021 | 11/1950 | Gunderson | 211/89 |
| 2,532,022 | 11/1950 | Gunderson | 211/89 |
| 2,620,809 | 12/1952 | Rosen | 24/259 R X |
| 2,677,468 | 5/1954 | Dreyfus, Jr. | 211/71 |
| 3,102,638 | 9/1963 | Saunders | 211/71 |
| 3,210,035 | 10/1965 | Vincens | 403/373 X |
| 3,291,079 | 12/1966 | Ruda | 403/361 X |
| 3,310,179 | 3/1967 | Cappuzzello | 24/259 R X |
| 3,312,034 | 4/1967 | Steinmann | 403/387 X |
| 3,353,852 | 11/1967 | Wood | 403/379 X |
| 3,357,731 | 12/1967 | Piget | 403/379 |
| 3,645,569 | 2/1972 | Reilly | 403/361 X |
| 3,967,346 | 6/1976 | Young, Jr. | 211/89 |
| 4,291,810 | 9/1981 | Rubenstein | 211/89 |

FOREIGN PATENT DOCUMENTS 48988 3/1911 Austria .............................. 211/205

Primary Examiner—William H. Schultz
Assistant Examiner—Blair M. Johnson
Attorney, Agent, or Firm—James E. Nilles

[57] ABSTRACT

An integrally formed spring clip support for supporting articles and including an elongated steel support member having a plurality of clips formed along its length and which are partially punched from the support member to form integrally formed clips that resiliently engage an article to be displayed. The clips are formed with an arcuate, spring-like portion integrally attached to the support and about which the clip pivots. An integral spring clip support assembly including a base and a pair of elongated, channel shaped support members arranged back to back with one another and insertable in said base for being held in a vertical position; a wedging plug is insertable in the base and engageable with the support member to hold the latter tightly in the base; a plurality of spring acting clips are integrally formed along the length of the support member for holding articles thereon; a double ended plug can be used to hold two support members in end to end relationship to effectively double the length of the assembly.

4 Claims, 16 Drawing Figures

INTEGRAL SPRING CLIP SUPPORT ASSEMBLY FOR DISPLAYING ARTICLES

BACKGROUND OF THE INVENTION

Various types of display rack clips have been proposed such as shown in U.S. Pat. Nos. 3,967,346, issued July 6, 1976; 3,498,469, issued Mar. 3, 1970; 3,310,179, issued Mar. 21, 1967; 3,223,095, issued Dec. 14, 1965; 2,677,468, issued May 4, 1954 and 2,532,021, issued Nov. 28, 1950. All of these prior art devices however utilize clips which are separately formed from the support, are costly to manufacture, must be individually assembled and are subject to malfunction and loss of the individual parts.

SUMMARY OF THE INVENTION

The present invention provides an integrally formed spring clip support having an elongated steel support member from which resilient clips are partially punched and thus integrally formed therewith. The clips include an intermediate arcuate portion integrally attached to the steel support and which act as a pivot point for the clip and resiliently urge the clip into article contacting position. The clip is formed simply by the stamping or punching operation, need not be assembled separately on the support and cannot malfunction due to improper assembly or looseness of the clip. Another aspect of the invention relates to an integral spring clip support assembly including a pair of channel cross-sectional shaped, elongated steel support members arranged together to form a rectangle in cross-section support having the above-mentioned integral spring clips formed along opposite sides and along its length. A still more limited aspect of the invention relates to such a support assembly having means for firmly holding the vertical support in a base member. The invention furthermore contemplates the use of a connector between the two channel shaped members whereby the latter can be easily snapped and held together in assembled relationship.

This and other objects and advantages of the present invention will appear hereinafter as this disclosure progresses, reference being had to the accompanying drawings.

BRIEF DESCRIPTION OF THE DRAWINGS

FIG. 13 is a perspective view of a hanger-type, single support post, and showing two displayed articles clipped thereto, and furthermore showing the hook and a display sign attached to the upper end of said assembly;

FIG. 14 is a fragmentary, exploded, perspective view of the upper end of the assembly shown in FIG. 13;

FIG. 15 is a perspective view of the hook shown in FIG. 14 and

FIG. 16 is a fragmentary cross-sectional view, of the upper end of the assembly shown in FIG. 13, but on an enlarged scale, and showing the upper end of the single support post, the hook, and the display sign.

DESCRIPTION OF A PREFERRED EMBODIMENT

Figure 1:
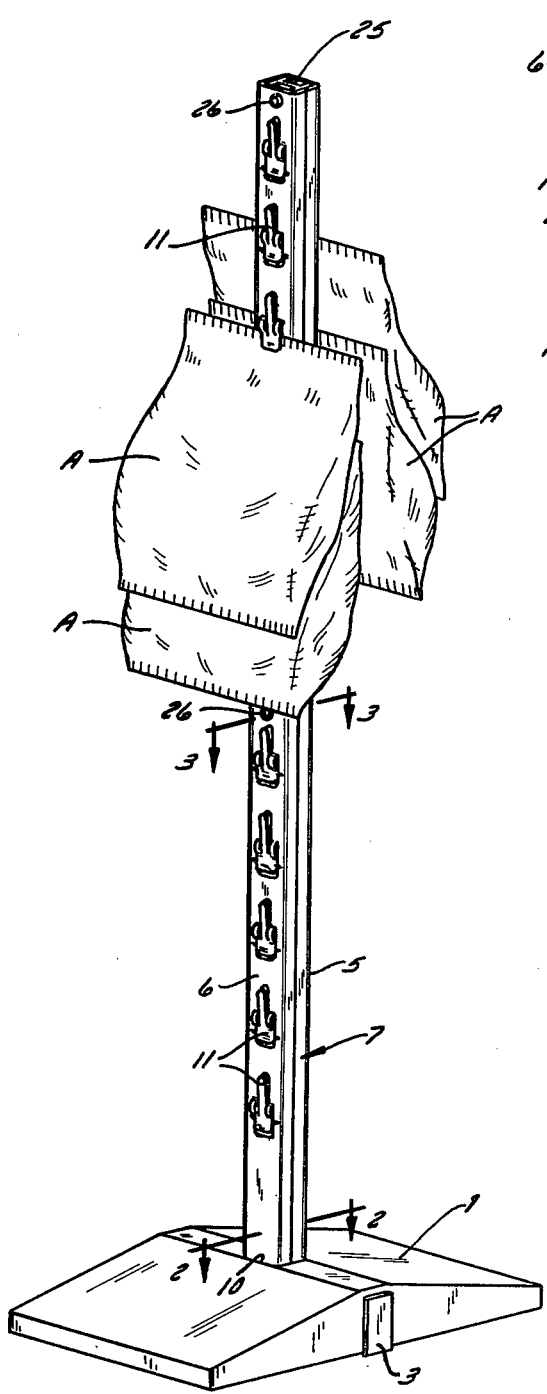
FIG. 1 is a perspective view of a support assembly for displaying products and showing several items to be displayed clipped to the support post.
Figure 3:
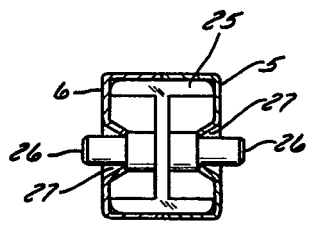
FIG. 3 is a cross-sectional view taken along line 3—3 of FIG. 1 but on a slightly enlarged scale, and showing an I-beam connector holding the two channel shaped support posts together.
Figure 6:
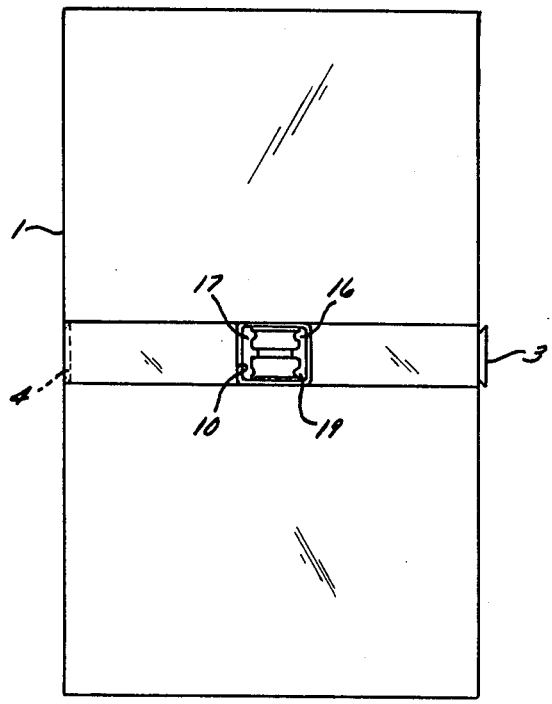
FIG. 6 is a top plan view of the base and showing the plug therein.
Figure 7:
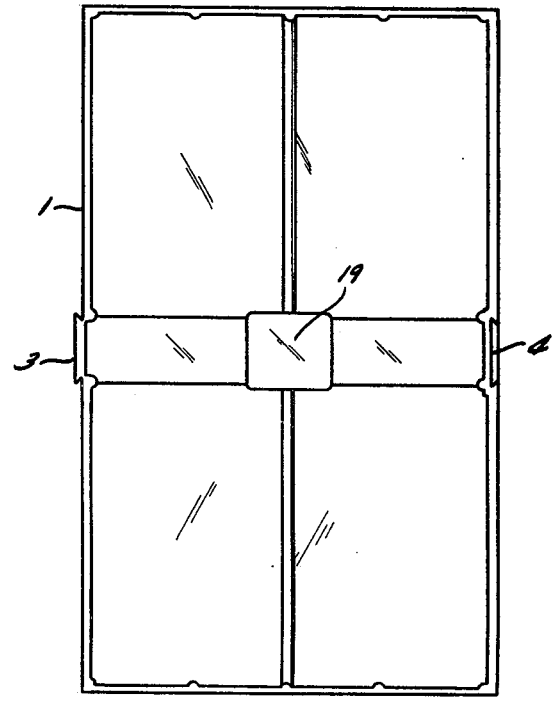
FIG. 7 is a bottom view of the base shown in FIG. 6.

Referring to FIG. 1, the spring clip support assembly includes a base 1 preferably made of plastic and of generally rectangular form in plan. Along opposite sides of the base are male and female inter-engaging members 3 and 4, respectively, which are clearly shown in FIGS. 3, 6 and 7. Member 3 is comprised of an outwardly extending projection of dovetailed shape while member 4 is a complimentary shaped recess in which a male member 3 of an adjoining base can be slidingly engaged. Thus a series of bases can be firmly attached to one another to form a series of support assemblies.

Figure 2:
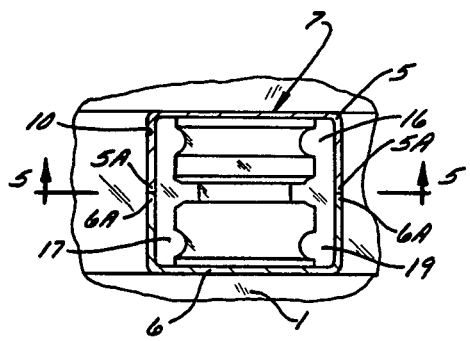
FIG. 2 is a cross sectional view taken generally along line 2—2 of FIG. 1 but on an enlarged scale.
Figure 5:
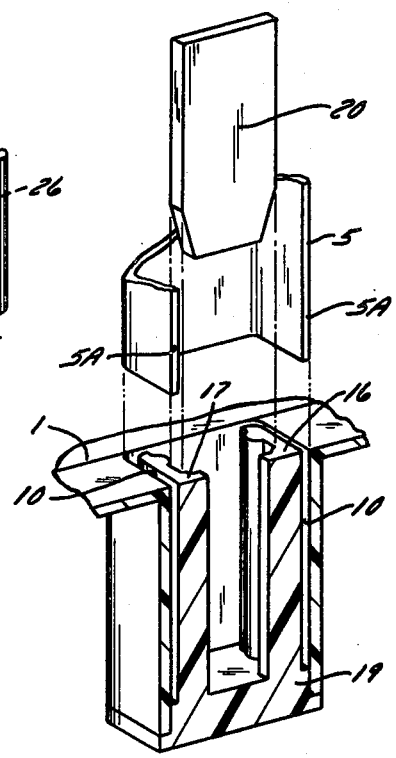
FIG. 5 is a fragmentary, perspective, exploded view, taken generally along line 5—5 in FIG. 2 and showing the plug inserted in the base and also showing a portion of one of the channel shaped posts and furthermore showing the tapered wedge for holding the plug in spaced apart position and tightly in the base.

The assembly shown in FIG. 1 also includes a pair of upwardly extending, elongated steel support members 5 and 6 which are each of channel cross-sectional shape and each having pairs of longitudinal edges 5A and 6A, respectively, (FIG. 2) which abut against one another to thereby form a rectangle in cross-section support member indicated generally by the numeral 7. This rectangle in cross-section support member is insertable into a central opening 10 (FIGS. 1, 2, 5, 6) of rectangular shape in the base 1, as will more fully appear in detail later.

Figure 9:
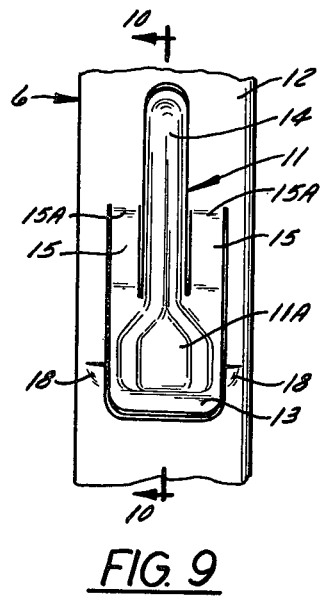
FIG. 9 is a fragmentary elevated view of one of the integral spring clips shown in FIG. 1, but on an enlarged scale.
Figure 10:
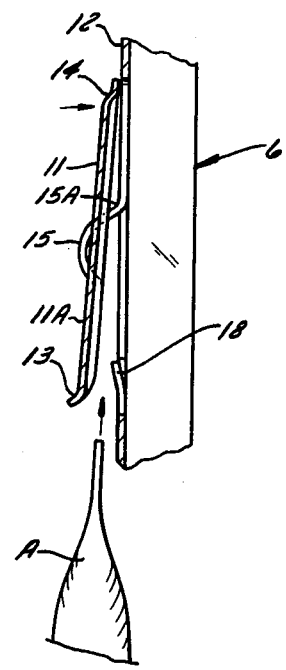
FIG. 10 is a sectional view and taken along line 10—10 in FIG. 9, showing the spring clip when pressed to an open position and a portion of one of the items to be displayed about to be inserted in the open end of the clip.
Figure 8:
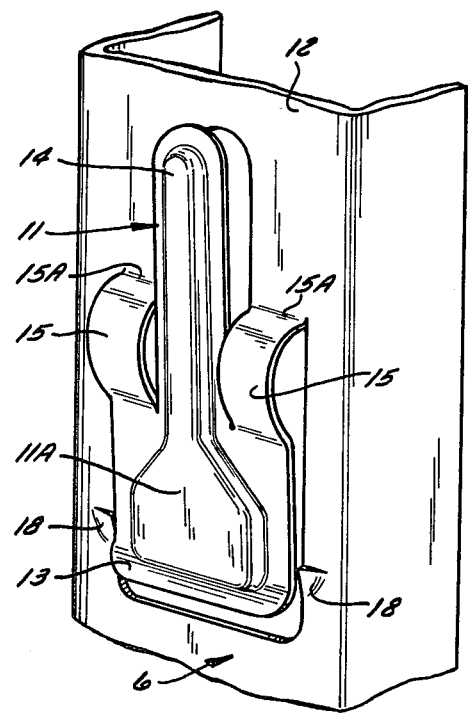
FIG. 8 is an enlarged fragmentary, perspective view of a portion of a support post shown in FIG. 1 and showing the integral spring clip which is stamped in the support post.

A series of integrally formed spring clips 11 are formed along the length of the support members 5 and 6 and are spaced apart from one another as shown for individually releasably supporting article A to be displayed, such as, for example, bags of potato chips. The chips 11 are partially punched from the substantially flat side 12 of the support members. The clips have a lower article engaging end 13 and an upper, finger-operated end 14. The clip also includes an intermediate arcuate portion 15, one on each side, and which are integrally attached at 15A to the support member. It will also be noted that the clip 11 has a raised portion 11A stamped along its length to thereby make it more rigid. The clip is formed by punching from the support member as mentioned, and the lower article engaging end 13 is normally in an inner position adjacent the flat wall 12 to thereby grasp the edge of the article A between end 13 and the substantially flat side on the support member 5. As indicated in FIG. 10, when the upper, finger-operated end 14 is pushed inwardly towards the support member as indicated by the arrow, the lower end of the clip is opened to receive the article A. When the end 14 is released, the spring portion 15 acts to return the clip to the engaged or closed position. It will be noted in FIGS. 8, 9 and 10 that a pair of projections 18 are also punched from the flat side 12 and which act, the combination of the clip end 13, to hold the article firmly in place and prevent its accidental withdrawal.

For the purpose of firmly holding the support member 7 in the opening 10, a U-shaped plug 19, also preferably formed of plastic, is inserted into the opening 10. This plug has a pair of spaced apart, upwardly extending free legs 16 and 17 over which the rectangular support member 7 is slipped when being inserted into the opening 10. The channel shaped supports 5 and 6 can be separately inserted into the opening 10, for example, support member 5 can be inserted first and then a tapered wedge 20 (FIGS. 2 and 5) can be inserted tightly between the legs, urging them apart. The other support member 6 can then be inserted in the opening and the combined support member 7 is thus tightly and frictionally held in the opening.

Figure 4:
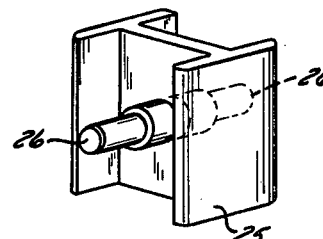
FIG. 4 is a perspective view of the I-beam connector shown in FIG. 3, but on an enlarged scale.

For the purpose of holding the supports 5 and 6 tightly together along the length, a connector 25 (FIGS. 3 and 4) is inserted between the members 5 and 6 and the protruding dowels 26 of the connector 25 are inserted in aligned holes 27 of support members 5 and 6. Thus the members 5 and 6 are snapped over the dowels 26 and are frictionally held together by the connector 25 snugly engaged therebetween.

Figures 11, 12:
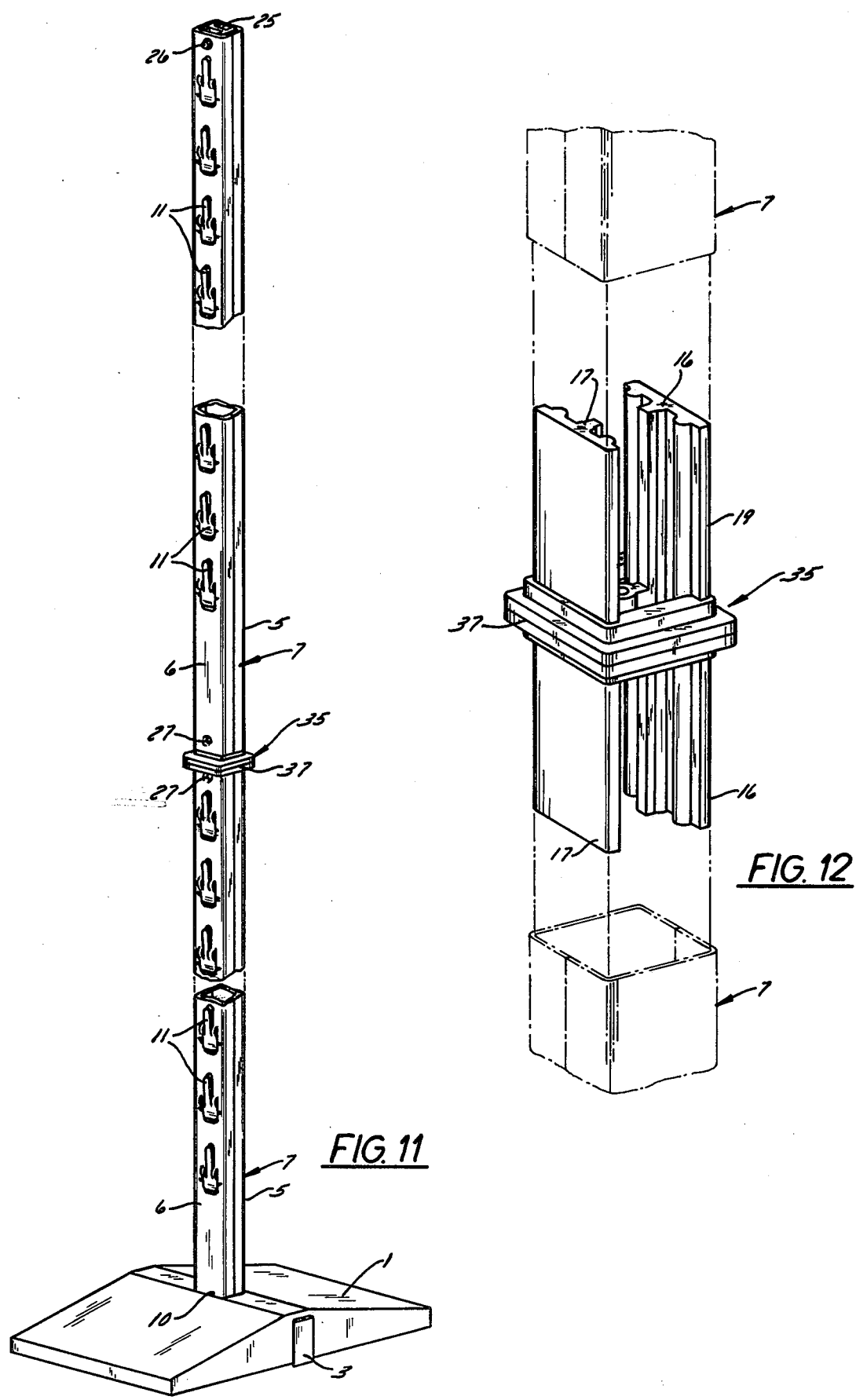
FIG. 11 is a view similar to FIG. 1, but without the displayed items, and showing a double stack arrangement wherein two pairs of channel shaped support posts are mounted one upon the other by means of an extending connector.
FIG. 12 is a perspective view of the extending connector shown in FIG. 11, but on an enlarged scale, the view also showing fragmentary portions of the lower and upper support posts.
Figure 13:
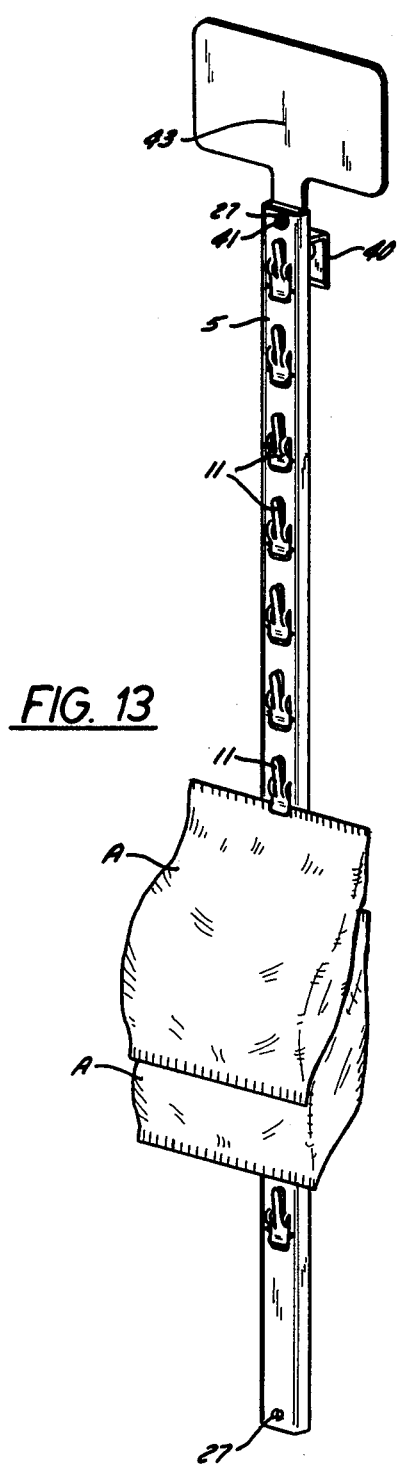
FIGS. 13 through 16 show a hanger-type support assembly utilizing only one channel shaped support post which is adapted to be hung from its upper end by means of a hook.
Figure 14:
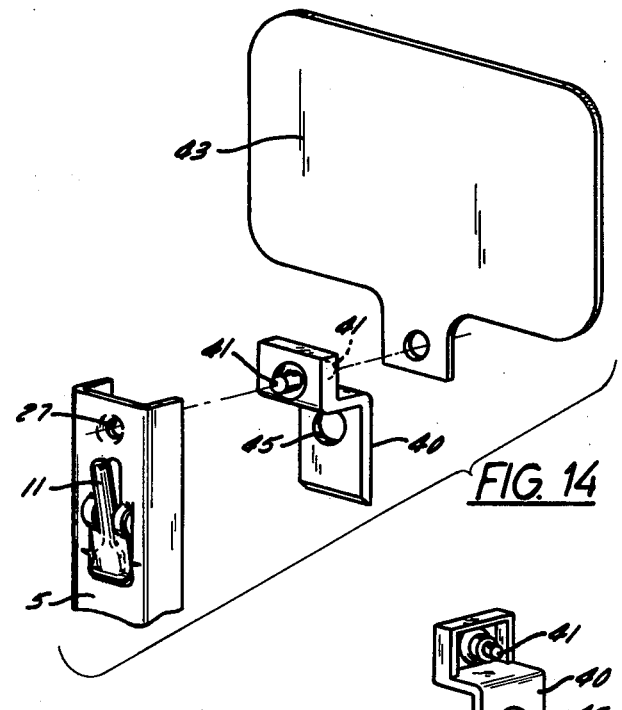
Figure 15:
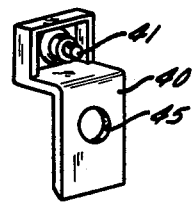
Figure 16:
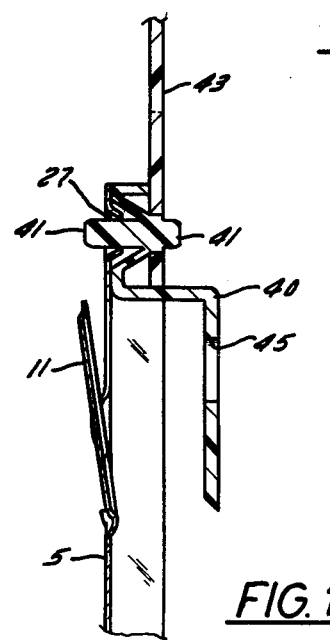

As shown in FIGS. 11 and 12, a double stack arrangement is shown wherein two pairs of channel shaped support members or posts are mounted one on top of another by means of an extending connector or plug indicated generally at 35. The plug 35 is actually a pair of plugs 19 shown in the other figures but which have been glued together along their adjacent surfaces or glue line 37. In this manner the capacity of the assembly can be doubled without utilizing any additional floor or shelf space.

Referring to FIGS. 13 through 16, a hanger type support assembly is shown wherein the support post or member is hangingly suspended rather than utilizing the base 1. The support member is suspended by means of the L-shaped hook 40 which has an upper double dowel 41 which is engageable in corresponding holes 27 in the upper end of the support member. A sign 43 can also be secured on the dowel member 41 as indicated. The hook also has a hole 45 by means of which it can be suspended on a nail or other projection (not shown).

I claim:

1. An integral spring clip support assembly for displaying articles and comprising, a base, a pair of elongated steel support members each of channel cross-sectional shape and having spaced apart longitudinal edges, the support members arranged back to back with one another and having the longitudinal edges abutting against one another to thereby form a rectangle in cross-section support member, an opening in said base for the reception of said rectangular support member, a U-shaped plug having a pair of spaced apart upwardly extending free legs, said plug being inserted in said opening in said base for receiving said rectangular in cross-section support member between said opening and said plug to firmly hold said support member in said base; each of said support members having a substantially flat side and a series of integrally formed clips located in spaced apart relationship along the length of each flat side whereby said clips support individual articles for display, said clips partially punched from said flat sides and each having a free article engaging end and a free finger-operated end, both of said ends being punched free of said flat side, said clip having an intermediate arcuate portion located intermediate its length, and by which said clip is attached to said flat side, said arcuate portion resiliently urging said engaging end toward said flat side and resiliently biasing said finger operated end away from said flat side, said article engaging end normally biased toward and located in article engaging contact with said flat side and said article engaging end being swingable away from said flat side about and against the bias of said arcuate portion when said finger-operated end is pushed towards said flat side against the bias of said arcuate portion.

2. The assembly set forth in claim 1 further including a wedge insertable in said plug and between said legs to urge the latter apart from one another so as to frictionally bind said support member to said base.

3. The assembly set forth in claim 1 including a connector insertable between said pair of channel cross-sectional shaped support members and engageable therewith to hold them firmly together.

4. An integral spring clip support assembly for displaying articles and comprising, a base, a pair of elongated steel support members each of channel cross-sectional shape and having spaced apart longitudinal edges, the support members arranged back to back with one another and having the longitudinal edges abutting against one another to thereby form a rectangle in cross-section support member, an opening in said base for the reception of said rectangular support member, each of said support members having a substantially flat side and a series of integrally formed clips located in spaced apart relationship along the length of each flat side whereby said clips support individual articles for display, said clips partially punched from said flat sides and each having a free article engaging end and a free finger-operated end, both of said ends being punched free of said flat side, said clip having an intermediate arcuate portion located intermediate its length, and by which said clip is attached to said flat side, said arcuate portion resiliently urging said engaging end toward said flat side and resiliently biasing said finger-operated end away from said flat side, said article engaging end normally biased toward and located in article engaging contact with said flat side and said article engaging end being swingable away from said flat side about and against the bias of said arcuate portion when said finger-operated end is pushed towards said flat side against the bias of said arcuate portion, said base having male and female inter-engaging members along its sides whereby a plurality of bases can be engaged with one another.

* * * * *